United States Patent [19]

Tarzaiski

[11] Patent Number: 4,516,235

[45] Date of Patent: May 7, 1985

[54] DYNAMIC RECORD LEVEL CONTROL FOR OPTICAL DISC RECORDER

[75] Inventor: Richard J. Tarzaiski, Magnolia, N.J.

[73] Assignee: RCA Corporation, Princeton, N.J.

[21] Appl. No.: 437,264

[22] Filed: Oct. 28, 1982

[51] Int. Cl.³ .............................................. G11B 7/00
[52] U.S. Cl. ................................................ 369/116
[58] Field of Search ..................... 369/106, 53, 54, 58, 369/109, 111, 116, 118, 124; 346/76 L; 358/392

[56] References Cited

U.S. PATENT DOCUMENTS

| | | | |
|---|---|---|---|
| 3,657,707 | 4/1972 | McFarland et al. | 340/173 |
| 4,093,961 | 6/1978 | Kanamaru . | |
| 4,097,895 | 6/1978 | Spong . | |
| 4,162,398 | 7/1979 | Kayanuma | 250/205 |
| 4,225,873 | 9/1980 | Winslow | 369/54 X |
| 4,283,785 | 8/1981 | Miyauchi et al. | 369/116 |
| 4,328,506 | 5/1982 | Yoshida et al. | 346/108 |

Primary Examiner—Donald McElheny, Jr.
Attorney, Agent, or Firm—Joseph S. Tripoli; Robert L. Troike; Christopher Lyle Maginniss

[57] ABSTRACT

In optical disc systems a record level control is provided for adjusting the power of the recording source. The waveform of the data detected during a read-after-write operation contains information concerning the power of the record source. These read-after-write signals are the same as those that are used during an actual playback operation. The record level control is implemented in two ways. In the first, the detected data is averaged to determine the record level. In the second technique the detected data is compared with an "ideal" signal derived from the detected data to provide an indication of a high or low record level. Further, the system includes means for adjusting the record level in response to an indication of a variation in the record level.

4 Claims, 6 Drawing Figures

DYNAMIC RECORD LEVEL CONTROL FOR OPTICAL DISC RECORDER

The Government has rights in the invention pursuant to a government contract.

The present invention relates to record disc systems for use in recording and retrieving information from a disc record and, more particularly, to a system for recording information wherein the record level of the recording means is controlled dynamically to compensate for variations in the system, e.g., the record medium surface.

BACKGROUND OF THE INVENTION

High density optical recording systems which may be used for recording and playing back information are known in the prior art. For example, U.S. Pat. No. 4,097,895, entitled "MULTI-LAYER OPTICAL RECORD" issued on June 27, 1978, in the name of F. W. Spong relates to an optical disc record/playback system wherein data is recorded in the form of pits in an absorptive coating on the surface of an optical disc. To put it in another way, the thermal energy of a focused high intensity light beam causes variations of the optical properties on the surface of the recording medium. In the Spong system, approximately $10^{11}$ bits of information can be stored on one side of a disc-shaped record medium having a 30 cm diameter.

In systems such as Spong it is necessary to control the bit sizes of the data being recorded. If the duty ratio of the pattern of information recorded on the record medium surface deviates from that of the signals being recorded the bit error rate of the system may exceed that which is permissible. For example, when the information being written is modulated at a 50% duty cycle the recorded portions of the record medium surface will be equal in length, over a small region of the disc surface, to the unrecorded portions. Variations between the recording signal and that which is recorded affect the output signal recovered from the record medium surface, thus adversely affecting the bit error rate of the information recorded.

These variations may be caused by several different effects. One reason is that the energy of the recording source is lost into the substrate of the record medium. It takes more energy to record on the outside portions of a disc than on the inside portions when recording at constant angular velocity. Another reason is that the record level necessary to effect recording may differ from one record medium to another depending upon the composition of the record medium or variations in the thickness of the medium. A further reason is that there may be variations in the record medium itself. On one record medium, for example, the thickness of the recording surface may vary from one portion thereof to another thus affecting the power level necessary to effect recording.

SUMMARY OF THE INVENTION

In accordance with the principles of the present invention a dynamic record level control is provided which determines whether the data is over or under recorded, determines how much and provides a signal to adjust the power to the write source. In accordance with this system the record level control is independent of the record medium used.

In some prior art schemes the power of the record source is varied based on a read-while-write output. The problem with such systems is that there is settling time after write. That is, after a write pulse, the size of the resulting pit continues to change until cooling takes place. If the data is detected prior to the end of the settling time an interpretation of the output must be made before the analysis with respect to the power level may be made. In accordance with one aspect of the present invention no interpretation of the input data is necessary.

In accordance with a further aspect of the present invention a data processing system for use in recording or retrieving information signals is provided. The information signals are recorded in tracks on a surface of a record medium. The system includes recorder means for recording the information signals in the tracks on the record medium and control means for controlling the recorder means to operate at a controlled record level. The record level is controlled such that surface effects are produced that are representative of the information signals. Further, the system includes means for retrieving the information signals from the record medium which retrieving means is arranged to read the information signals temporally after the information signals are recorded by the recorder means. An adjustment means is provided for dynamically adjusting the control means for varying the record level of the recorder means to maintain the record level at a level such that the surface effects are representative of the information signals, whereby the adjustment means is responsive to variations detected in the retrieved information signals.

DESCRIPTION OF THE PREFERRED EMBODIMENTS

Figure 1:
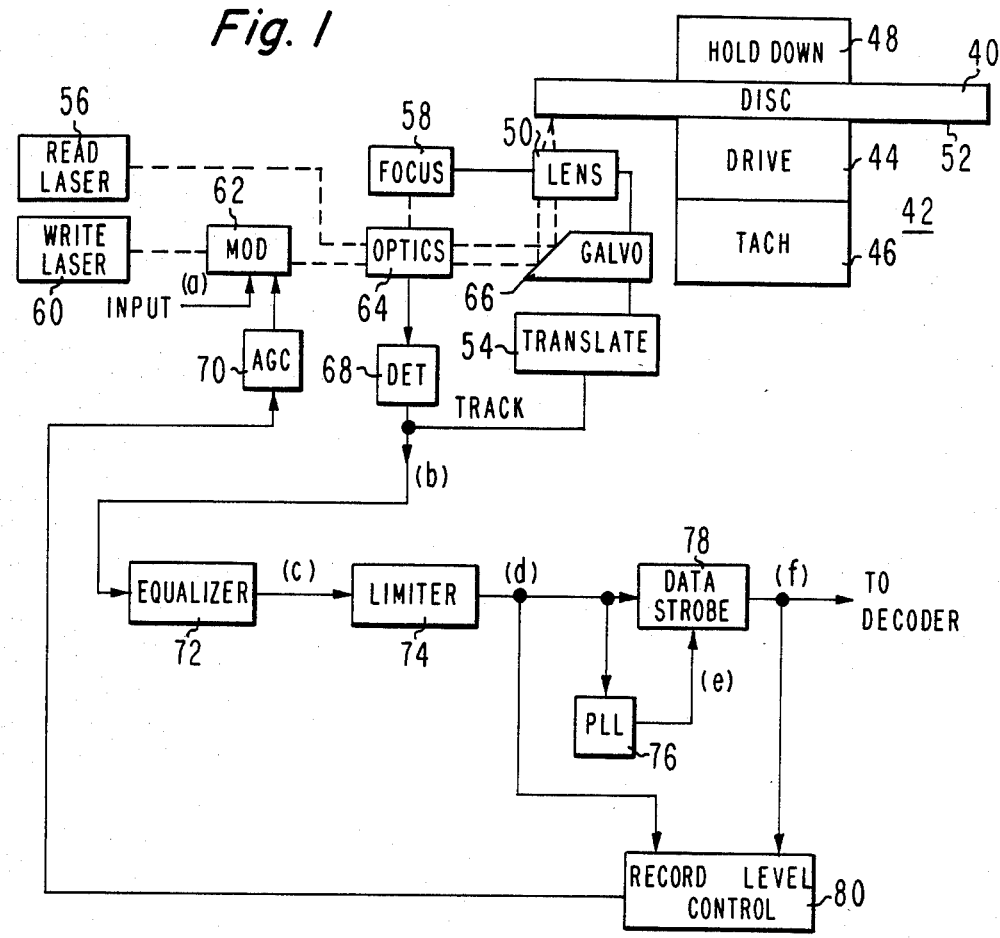
FIG. 1 illustrates, via a block diagram representation, a functional description of the drive assembly and associated circuitry for the read/write system embodying the principles of the present invention.

FIG. 1 shows an optical disc player-recorder apparatus. In operation, disc 40 is placed on turntable 42 which includes drive 44, tachometer 46 and hold-down mechanism 48 by which disc 40 is held in place. After disc 40 is clamped in place, disc drive 44 is activated to rotate disc 40 at a predetermined angular speed, as measured by tachometer 46. Before a record or read operation can proceed, however, focus lens 50 must be positioned under the desired portion of the disc and arranged such that the light beam from lasers 56, 60 are focused onto surface 52 of disc 40. Lens 50 is positioned with respect to disc 40 by a motor driven translation stage 54.

When lens 50 is properly positioned with respect to the disc surface, read laser 56 is turned on so that a proper focus setting may be obtained. Focus is achieved by a servo-loop (not shown) which operates from the read laser light reflected from disc surface 52. A lens positioner 58 maintains the focus distance from disc surface 52 during both record and read operations.

After focus has been achieved, the desired operation may be initiated. In the record mode write laser 60 is activated. Data is clocked into modulator 62 which modulates the light that impinges on the disc surface from laser 60 in accordance with the signal to be recorded. The modulated record beam is directed to disc 40 via optics 64 and galvanometer control mirror 66. The modulated record beam is focused onto disc surface 52 to form a series of surface variations on the surface of the disc of varying duration and spacing as the disc rotates. The pattern of surface variations on the disc is recorded in consonance with the signal provided to the input of modulator 62. The resultant track that is formed contains the recorded information. When the information is to be recorded in concentric tracks, recording in a second track requires inactivating the record laser for a short time while lens 50 is repositioned to a point on disc 40 at which the next track is to be recorded. This repositioning takes place very quickly (for example, in less than 1 millisecond) and may be accomplished by moving the galvanometer 66 via translation stage 54. The translation stage 54 moves in increments (for example, 4 track spacings) and intermediate positions may be obtained by commanding the galvanometer 66 to tilt slightly. After repositioning takes place, write laser 60 is reactivated and a second track of data is fed into modulator 62 for recording. This sequence will repeat for as long as data is available for recording. To insure that the desired track may be found during read, the information signals input to modulator 62 are recorded with a unique address to identify each track. It should be noted that the information may be recorded in a spiral format on the disc surface by moving translation stage 54 at a constant rate across the surface of the disc.

In the read mode the write laser is turned off. When lens 50 is positioned and focus is achieved a track servo (not shown) may be activated causing the read beam to lock onto the track nearest the center of the optical field of view. The track servo uses galvanometer 66 for steering the beam in response to the detected signal from detector 68. The difference between the track the beam is following and the desired track is used to reposition the galvanometer and translation stage to the correct location. When the proper track is being read the data may be outputed from detector 68 to suitable processing circuitry (not shown).

Data verification during recording may be achieved by reading the information just after it has been recorded. The position of the focus read laser spot is adjusted so that it illuminates the pits being recorded temporally just after recording takes place. Thus, the output data from the record/read module during a record operation may be compared to that which was input. If the number of errors encountered in the read process is below the requirements of the system no correction is made. When errors are detected, the data may be rerecorded and again verified for accuracy.

Figure 2:
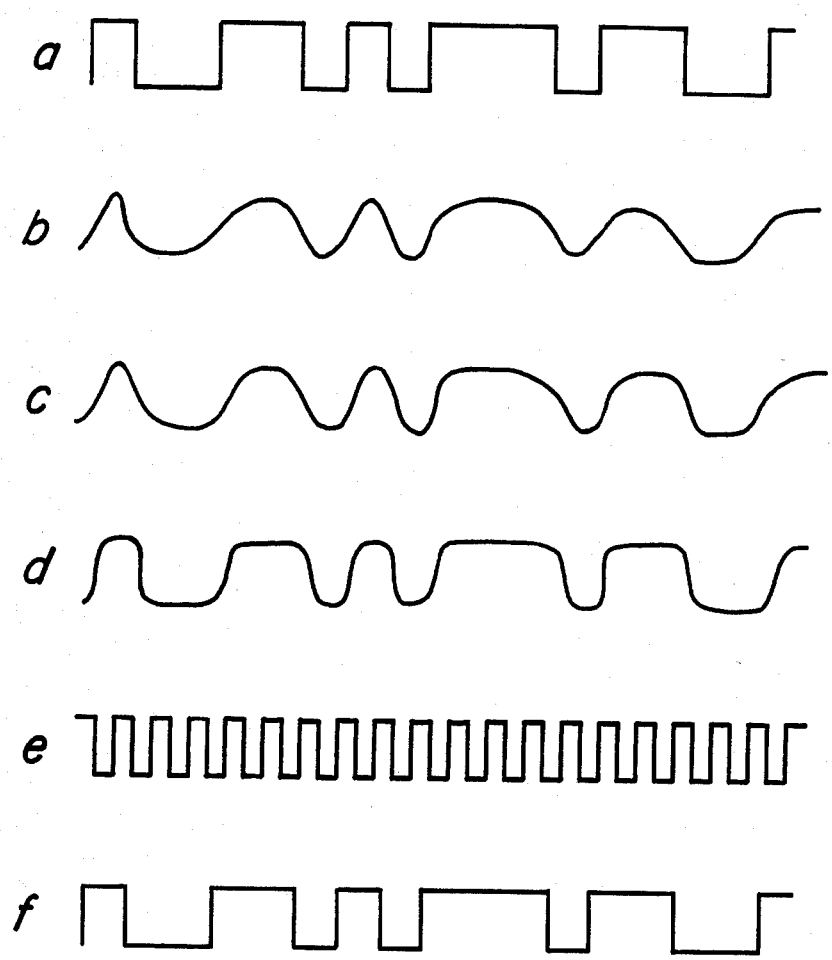
FIG. 2 consisting of a–f illustrates a timing diagram for use in explaining the operation of the system of FIG. 1.

The signal recorded during the record process may be a digital signal. The function of modulator 62 is to modulate the input laser beam from write laser 60 in accordance with the digital format chosen. The following description will be made in the context of a delay modulation digital code (DM 1, 3). The DM code has been selected because it is a very efficient self-clocking code for recording systems and has been used in the past for magnetic recording systems. The DM code has three code symbols—length 1, 1½ and 2 times the fundamental data bit duration. FIG. 2 includes a timing diagram 2a which represents a typical DM signal for input to the modulator 62. Modulator 62 may be an acousto-optic device as manufactured by Harris Corporation having an automatic gain control (AGC) 70 which controls the record level of write laser 60. Modulator 62 is operated in accordance with signal input 2a to record a pattern on surface 52 in consonance therewith. As noted above, the data is retrieved just after recording to provide data verification. The signal, shown in timing diagram 2b, represents the signal output from detector 68, which bears little resemblance to the signal input of timing diagram 2a. The signal output of detector 68 is equalized in equalizer 72. The equalizer is designed to flatten the overall frequency response of the detector-equalizer combination. For example, frequency distortion results from the finite size and shape of the optical spot. This has the effect of limiting the packing density of bits on the disc. Lack of response at higher frequencies causes a rounding of waveform edges and an amplitude loss which makes it difficult to distinguish closely spaced data bits. Equalizer 72 sharpens the edges of the data signal in a manner shown in timing diagram 2c. The equalized waveform is converted into a sharp edged binary signal, as shown in timing diagram 2d, in an amplitude limiter 74. The output of the limiter, i.e. the amplitude limited data signal, is a signal which will provide information related to the disc data content, however, this signal is not suitable for decoding because it lacks edge definition. Further a clock signal which will be used during the decoding process must be generated. This clock signal is derived from the limited data signal via phase locked-loop 76. The transitions in the limited data provide timing information for the phase locked-loop to establish a clock signal that can be used down stream in the decoder as well for the purpose of strobing the limited data signal. Thus, from the limited data a clock signal, shown in timing diagram 2e, is derived in phase locked loop 76. The clock signal from phase locked loop 76 strobes the limited data in data strobe 78 to generate a signal suitable for decoding the information in the user's data file. The strobed data shown in the timing diagram 2f should be an exact reproduction of the data input of timing diagram 2a.

In accordance with the principles of the present invention, a record level control 80 is provided for dynamically adjusting the record level of write laser 60 during the recording process. According to the system of FIG. 1 the record level is controlled by means of acousto optic modulator 62. Modulator 62 includes an AGC control 70 for adjusting the intensity of the laser beam emitted by the modulator. This dynamic adjustment is based on the output of the detector 68. The detected data is recovered almost immediately after writing but sufficient delay is permitted to assure that the recording process is complete.

The operation of record level control 80 will be explained with reference to FIGS. 3 and 4. The FIG. 3 embodiment relates to a system wherein the record level is adjusted based on the duty cycle of the signal from limiter 74, i.e., the limited data signal, while the FIG. 4 embodiment relates to a system wherein the record level is adjusted based on the signals from limiter 74 and data strobe 78, i.e., the limited data and the strobe data respectively.

Figure 3:
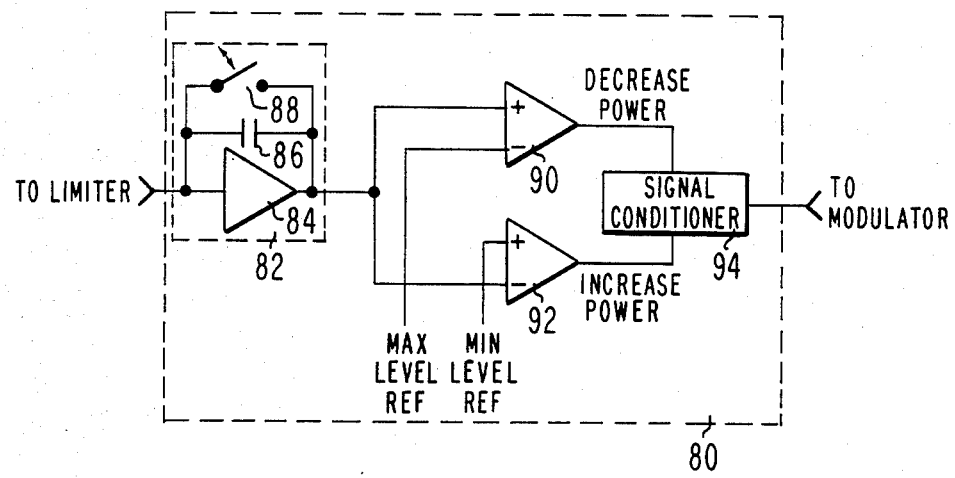
FIG. 3 shows one embodiment of the record level control of FIG. 1 embodying the principles of the present invention.

The system of FIG. 3 measures the average amplitude of the limited data over fixed time intervals. An over-recorded signal (excessive duty cycle) will yield a higher-than-normal average while an under-recorded signal will yield a lower-than-normal average. In operation, the limited data signal from limiter 74 of FIG. 1 is integrated in time quantized integrator 82 which includes operational amplifier 84, capacitor 86 and switch 88. Integrator 82 provides an output signal representative of the average amplitude of the limited data over a fixed interval of time determined by switch 88. The combination of operational amplifier 84 and capacitor 86 provide, in a known manner, an integrating network. Since it is desirable to adjust the record level frequently on a real time basis integrator 82 is provided with switch 88 for discharging capacitor 86 at fixed intervals. The integration intervals are selectable to provide the response time desired. For example, it may be desirable to sample at a rate of 1,000 times in every once-around of the disc, illustratively, for a disc system where the disc is rotated at 30 Hz the sample rate would be 30 KHz.

The integrated output from integrator 82 is coupled to the non-inverting and inverting inputs of comparators 90 and 92 respectively. The inverting input of comparator 90 is coupled to a reference which provides a threshold for indicating an over-recorded signal. If the average of the limited data indicates an over-recorded situation (average duty cycle greater than the desired range) comparator 90 provides an output to decrease the record level. On the other hand, non-inverting input to comparator 92 is set at a reference which provides a threshold for an under-recorded situation. When the inverting input to comparator 92 exceeds the threshold reference comparator 92 goes high indicating an under-recorded situation (average duty cycle less than the desired range) and signaling a need for an increase in record level. Signal conditioner 94 receives signals from comparators 90 and 92 and converts them into an analog voltage for controlling acousto-optic modulator 62 via AGC 70. Signal conditioner 94 is sampled at fixed time intervals (illustratively, just before switch 88 is closed) to determine whether the record level should be corrected. If comparator 90 is high indicating a command to lower the record level power the output voltage from signal conditioner 94 is incremented to control modulator 62. If comparator 92 is high indicating a low record level the output of signal conditioner 94 is decremented to increase the record level of modulator 62.

The technique of FIG. 3 depends upon code statistics. For example, choosing a three-phase-seven (3 $\phi$ 1, 7) code over a delay-modulation code may affect the system performance. The time quantized integrator technique offers some promise for use with codes that have more short symbols than long. However, in some situations, the averaging technique may not be desirable.

Figure 4:
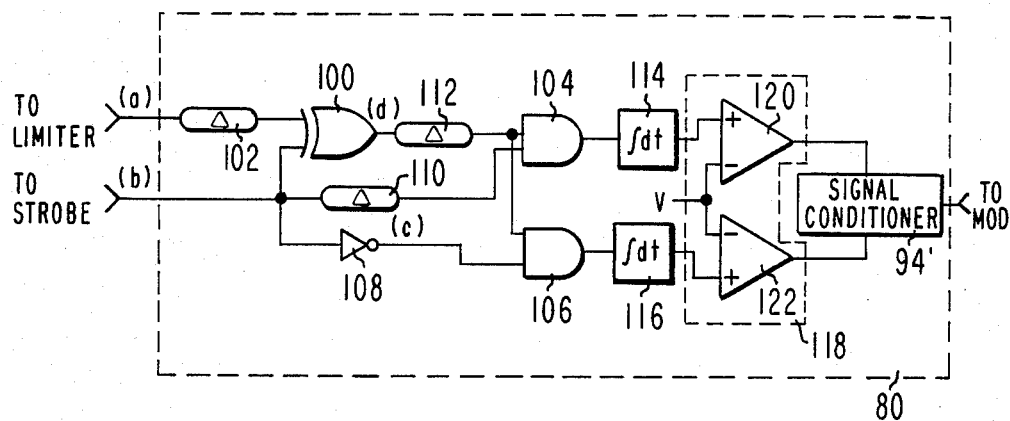
FIG. 4 shows another embodiment of the record level control of FIG. 1 embodying the principles of the present invention.

Referring to FIG. 4 a technique is illustrated for measuring the actual distortion of the amplitude limited data with respect to an ideal waveform, i.e., the signal from the data strobe. In this arrangement the high- and low-power anomalies are sensed as deviations from a waveform that is constructed during the strobing process. In FIG. 4, the limited data is coupled to one input of exclusive-OR gate 100 via delay 102. The other input of exclusive-OR gate 100 is coupled to the strobed data. Further, the strobe data is coupled to one input of AND gate 104 via delay 110 and to an input of AND gate 106 via inverter 108. The output of exclusive-OR gate 100 is coupled via delay 112 to respective inputs of AND gates 104 and 106. The outputs from AND gates 104 and 106 are coupled via integrators 114 and 116 to non-inverting inputs of comparators 120 and 122 respectively. Comparators 120 and 122 form a window circuit 118 which isolates the system from noise and other undesirable effects. The outputs from comparators 120 and 122 are delivered to respective inputs of signal conditioner 94'. Signal conditioner 94' is coupled to modulator 62 via AGC 70 to control the record level of write laser 60.

The operation of the record level control 80 of FIG. 4 will be explained with reference to FIGS. 5 and 6. In the circuit of FIG. 4 the limited data is delayed in delay 102 and compared to the strobed data in exclusive-OR gate 100. Delay 102 is provided to match the strobe and limited data pulses. Exclusive-OR gate 100 generates an output signal if there is a difference between the limited data and the strobe data. The timing of the pulses from exclusive-OR gate 100 contains information concerning the sense of the recorded level (too high or too low). If the limited data pulses are longer than the strobed data pulses then the record level is too high, if the limited data pulses are shorter than the strobe data pulses then it is too low. This timing is detected by AND-ing the output of exclusive-OR 100 with the strobed data and its complement in AND gates 104 and 106 respectively. When the power level is excessive the pulses emerge from AND gate 106 and when it is low then AND gate 104 has a pulsed output. Normal power produces no output from either gate.

Figure 5:
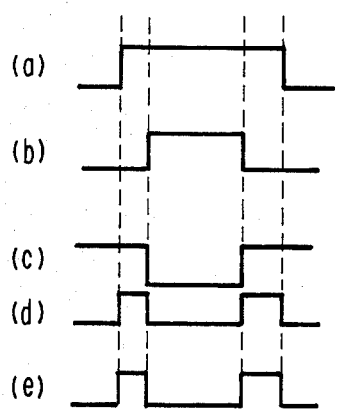
FIGS. 5 and 6 illustrate timing diagrams a–e for use in explaining the operation of the record level control of FIG. 4.

Referring to FIG. 5, a timing diagram of a high power situation is shown. The limited data pulse a is exclusive OR-ed with strobed data pulse b to provide two pulses of output as shown in d. The output pulses d are AND-ed with the inverted strobed pulse c to produce a pair of output pulses from AND gate 106 as shown in timing diagram 5e. It is clear from the timing diagram that in the excessive power case AND gate 104 will not be enabled, while AND 106 will produce at least a single pulse output.

Figure 6:
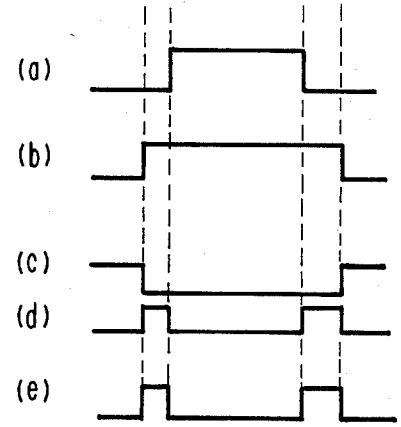

Referring to FIG. 6 a timing diagram of a low power situation is shown. Here, the limited data pulse a is gated through gate 100 with the strobed data pulse b to provide two pulses of output at its output as shown in d. The output pulses d are AND-ed with the non-inverting strobed pulses b to produce a pair of output pulses from AND gate 104 as shown in timing diagram 6e. Clearly, it can be seen that in the low power case AND gate 106 will not be enabled, while AND 104 will produce an output.

Referring again to FIG. 4 the outputs of gates 104 and 106 are integrated in time in integrators 114 and 116 respectively. Integrators 114 and 116 may be implemented as described with respect to FIG. 3. The integrated signals are then passed through window circuit 118 to generator power control commands which are delivered to signal conditioner 94'. The comparators 120 and 122 have their respective inverting inputs connected to some reference value. Signal conditioner 94' operates in generally the same manner as signal conditioner 94 of FIG. 3 to adjust the record level of the laser beam which passes through modulator 62.

Further, it should be noted that delay 110 and inverter 108 could be implemented by an OR-gate having inverting and non-inverting outputs. For example, an emitter-coupled-logic OR-gate could be used.

Measurement of the pulse width is possible because, regardless of the recording level, the frequency of the decoding VCO within phase locked loop 76 remains constant as does the time delay through the phase locked loop which defines the strobe signal. Response to small phase changes at the code symbol boundaries is of little consequence due to the limited response bandwidth of the phase locked loop.

Dynamic record control is intended to enhance performance of a system otherwise properly adjusted. It takes into account the sensitivity of the record medium. For example in optical disc systems it will permit usage of different types of disc on a single machine and adjust for variations in a given disc. Dynamic record control utilizes circuitry which is already available in most optical disc systems and requires only the addition of the dedicated gates, integrators and power level command circuitry described herein.

Dynamic record control is intended to lead to an automatic machine requiring minimum operator control of the power level of the optical disc player. It will enhance overall bit error rate performance by constantly (dynamically) optimizing recording conditions. It is desirable in recording systems that each record medium be characterized automatically at the start of recording such that the recordings on the record medium are optimized from the beginning of the recording.

Other embodiments of the invention will be apparent to those skilled in the art. For example, the claims and specification of the present invention are not meant to be limiting to optical disc systems. In other systems, such as magnetic, it may be desirable to use a record level control to reduce the sensitivity of the system to variations in the record medium or to reduce the bit error rate.

What is claimed is:

1. In a data processing system for use in recording or retrieving information signals, said information signals being recorded in tracks on a surface of a record medium, an apparatus comprising:

recorder means for recording said information signals in said tracks on said record medium;

control means for controlling said recorder means to operate at a record level, said record level being controlled such that surface effects are produced on said record medium;

retrieve means for retrieving said information signals from said record medium, said retrieve means being arranged to read said information signals temporally after said information signals are recorded by said recorder means;

detector means for detecting variations in the content of said retrieved information signals, said detector means further including means responsive to said retrieved information signals for generating first and second derived information signals, and means for exclusively OR-ing said first derived information signals with said second derived information signals to effect said variations; and adjustment means responsive to said detector means for dynamically adjusting said control means to maintain said record level at a level such that said surface effects are representative of said information signals.

2. The apparatus according to claim 1 further including gating means coupled to said exclusively OR-ing means for generating first and second sense signals representing, respectively, first and second senses of said variations, wherein said first sense signal causes said adjustment means to effect an increase in said record level, and said second sense signal causes said adjustment means to effect a decrease in said record level.

3. In an optical data processing system for use in recording or retrieving information signals, said information signals being recorded in tracks on the surface of an optical record medium, an apparatus comprising:

first source means for providing a light beam for effecting surface variations on said surface of said optical record medium representative of said information signals;

control means for controlling said first source means to operate at a record level, said record level being controlled to produce surface effects on said record medium;

second source means for retrieving said information signals recorded on said surface of said record medium, said second source means being provided to read said recorded information signals temporally after said information signals are recorded by said first source means;

detector means for detecting variations in the content of said retrieved information signals, said detector means further including means responsive to said retrieved information signals for generating first and second derived information signals, and means for exclusively OR-ing said first derived information signals with said second derived information signals to effect said variations; and adjustment means responsive to said detector means for dynamically adjusting said control means to maintain said record level at a level such that said surface effects are representative of said information signals.

4. The apparatus according to claim 3 further including gating means coupled to said exclusively OR-ing means for generating first and second sense signals representing, respectively, first and second senses of said variations, wherein said first sense signal causes said adjustment means to effect an increase in said record level, and said second sense signal causes said adjustment means to effect a decrease in said record level.

* * * * *